(12) United States Patent
Choi et al.

(10) Patent No.: US 12,370,874 B2
(45) Date of Patent: Jul. 29, 2025

(54) VEHICLE-BUILDING DOCKING SYSTEM AND METHOD OF CONTROLLING THE SAME

(71) Applicants: Hyundai Motor Company, Seoul (KR); Kia Corporation, Seoul (KR)

(72) Inventors: Ki Hyun Choi, Yongin-si (KR); Hyung Sik Choi, Seoul (KR); Sang Heon Lee, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 356 days.

(21) Appl. No.: 18/134,688

(22) Filed: Apr. 14, 2023

(65) Prior Publication Data
US 2024/0198773 A1      Jun. 20, 2024

(30) Foreign Application Priority Data
Dec. 14, 2022   (KR) .................. 10-2022-0175036

(51) Int. Cl.
| | |
|---|---|
| B60J 10/40 | (2016.01) |
| B60J 10/15 | (2016.01) |
| B60J 10/244 | (2016.01) |
| B60J 10/84 | (2016.01) |

(52) U.S. Cl.
CPC .............. B60J 10/40 (2016.02); B60J 10/15 (2016.02); B60J 10/244 (2016.02); B60J 10/84 (2016.02)

(58) Field of Classification Search
CPC . B60J 10/40; B60J 10/15; B60J 10/244; B60J 10/84; B60J 10/80; B60J 10/50; B60J 10/85; B60J 10/24; B60J 10/86; B60R 13/06
See application file for complete search history.

(56) References Cited

U.S. PATENT DOCUMENTS

| | | | | |
|---|---|---|---|---|
| 6,922,945 B2* | 8/2005 | Dron | ...................... | B60J 10/244 49/477.1 |
| 7,124,539 B2* | 10/2006 | Tsuchida | .................. | B60J 10/80 49/490.1 |
| 9,114,689 B2* | 8/2015 | Dietl | ......................... | B60J 7/047 |
| 10,569,631 B1* | 2/2020 | Williams | .................. | B60J 10/84 |
| 10,696,147 B2* | 6/2020 | Baskar | .................... | B60J 10/244 |
| 11,479,097 B2* | 10/2022 | Ryu | ........................ | B60J 10/80 |

(Continued)

FOREIGN PATENT DOCUMENTS

| | | | | |
|---|---|---|---|---|
| CN | 104786793 A | * | 7/2015 | |
| CN | 105984316 A | * | 10/2016 | ............ B60J 10/248 |

(Continued)

*Primary Examiner* — James A Shriver, II
*Assistant Examiner* — Ian Bryce Shelton
(74) *Attorney, Agent, or Firm* — Morgan, Lewis & Bockius LLP

(57) ABSTRACT

A vehicle-building docking system and a method of controlling the same include a lower weather strip coupled to a lower door frame, an upper weather strip coupled to an upper door frame and configured to slide upwards or downwards together with the upper door frame with respect to the lower weather strip, and a sealing tube provided between the lower weather strip and the upper weather strip and configured to inflate after the upper weather strip slides upwards or downwards to seal the gap between the lower weather strip and the upper weather strip.

17 Claims, 6 Drawing Sheets

(56) References Cited

U.S. PATENT DOCUMENTS

| | | | | |
|---|---|---|---|---|
| 11,498,402 B2* | 11/2022 | Takahashi | | B60J 10/25 |
| 2002/0026751 A1* | 3/2002 | Kawai | | B60J 10/21 |
| | | | | 49/479.1 |
| 2002/0152688 A1* | 10/2002 | Dron | | B60J 10/248 |
| | | | | 49/498.1 |
| 2004/0255519 A1* | 12/2004 | Tsuchida | | B60J 10/24 |
| | | | | 49/479.1 |
| 2005/0198907 A1* | 9/2005 | McKnight | | E05B 81/00 |
| | | | | 49/475.1 |
| 2010/0077672 A1* | 4/2010 | Nozaki | | B60J 10/16 |
| | | | | 49/483.1 |
| 2011/0078959 A1* | 4/2011 | Nozaki | | B60J 10/80 |
| | | | | 49/489.1 |
| 2013/0074416 A1* | 3/2013 | Cotnoir | | B60J 10/33 |
| | | | | 49/490.1 |
| 2015/0151617 A1* | 6/2015 | Um | | B60J 7/043 |
| | | | | 296/216.07 |
| 2015/0246605 A1* | 9/2015 | Kleinhoffer | | B60J 7/0046 |
| | | | | 296/216.06 |
| 2019/0168592 A1* | 6/2019 | Baskar | | B60J 10/40 |
| 2020/0300018 A1* | 9/2020 | Kamitani | | B60J 10/25 |
| 2021/0046811 A1* | 2/2021 | Ryu | | B60J 10/24 |
| 2021/0122220 A1* | 4/2021 | Ogawa | | B60J 10/84 |
| 2021/0347238 A1* | 11/2021 | Oshima | | B60J 10/86 |
| 2022/0072937 A1* | 3/2022 | Black | | B60J 10/27 |
| 2022/0072938 A1* | 3/2022 | Tanaka | | B60J 10/18 |
| 2022/0281299 A1* | 9/2022 | Takahashi | | B60J 7/0435 |

FOREIGN PATENT DOCUMENTS

| | | | | | |
|---|---|---|---|---|---|
| CN | 107804146 A | * | 3/2018 | | B60J 10/244 |
| CN | 213291955 U | * | 5/2021 | | |
| CN | 216684047 U | * | 6/2022 | | |
| DE | 102017011996 B3 | * | 3/2019 | | B60J 5/047 |
| GB | 2198773 A | * | 6/1988 | | B60J 10/244 |
| JP | 2-102846 U | | 8/1990 | | |
| JP | 6-85153 U | | 12/1994 | | |
| JP | 2014196052 A | * | 10/2014 | | B60J 10/15 |
| JP | 6127931 B2 | | 5/2017 | | |
| KR | H0540015 U | * | 5/1993 | | |
| KR | 100194705 B1 | * | 6/1999 | | |
| KR | 101499387 B1 | * | 3/2015 | | |
| KR | 10-1540776 B1 | | 8/2015 | | |
| KR | 20190043652 A | * | 4/2019 | | |
| KR | 10-2021-0130285 A | | 11/2021 | | |
| KR | 10-2369339 B1 | | 3/2022 | | |
| KR | 10-2400916 B1 | | 5/2022 | | |
| WO | WO-2017109324 A1 | * | 6/2017 | | B60J 1/16 |
| WO | WO-2019120739 A1 | * | 6/2019 | | B60J 5/047 |
| WO | WO-2020080033 A1 | * | 4/2020 | | B60J 10/242 |

* cited by examiner

[FIG. 1]
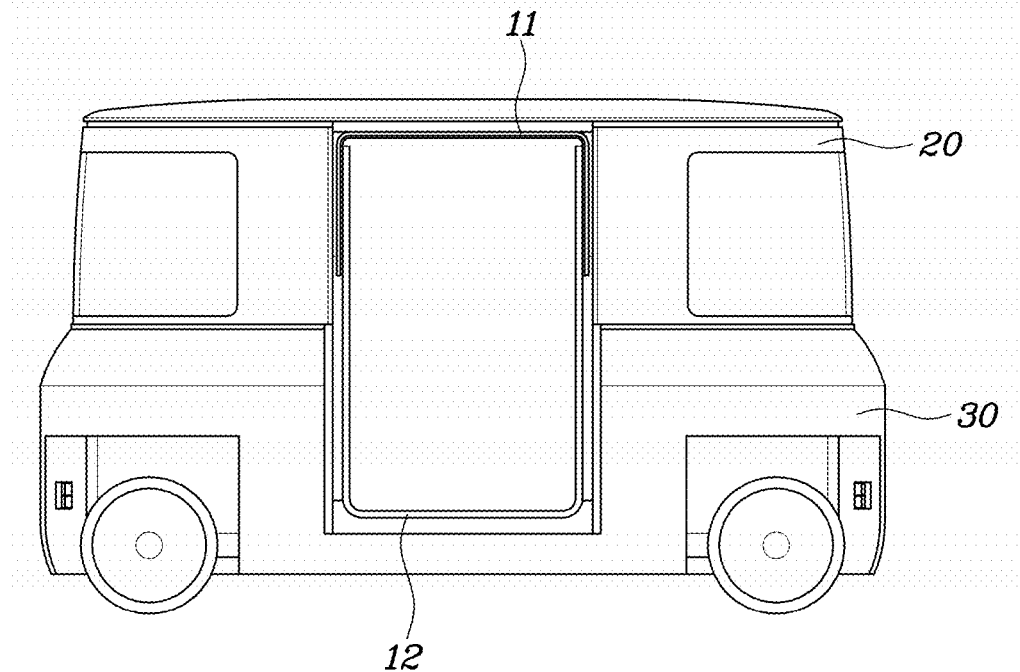
[FIG. 2]
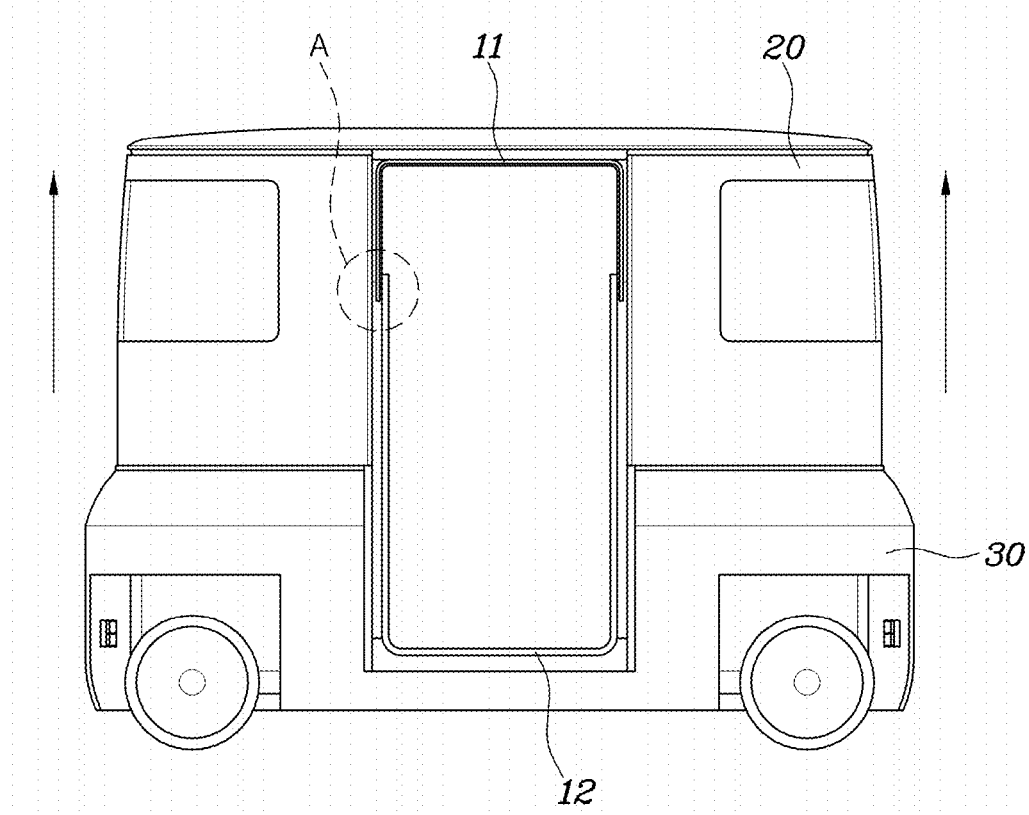

[FIG. 3]
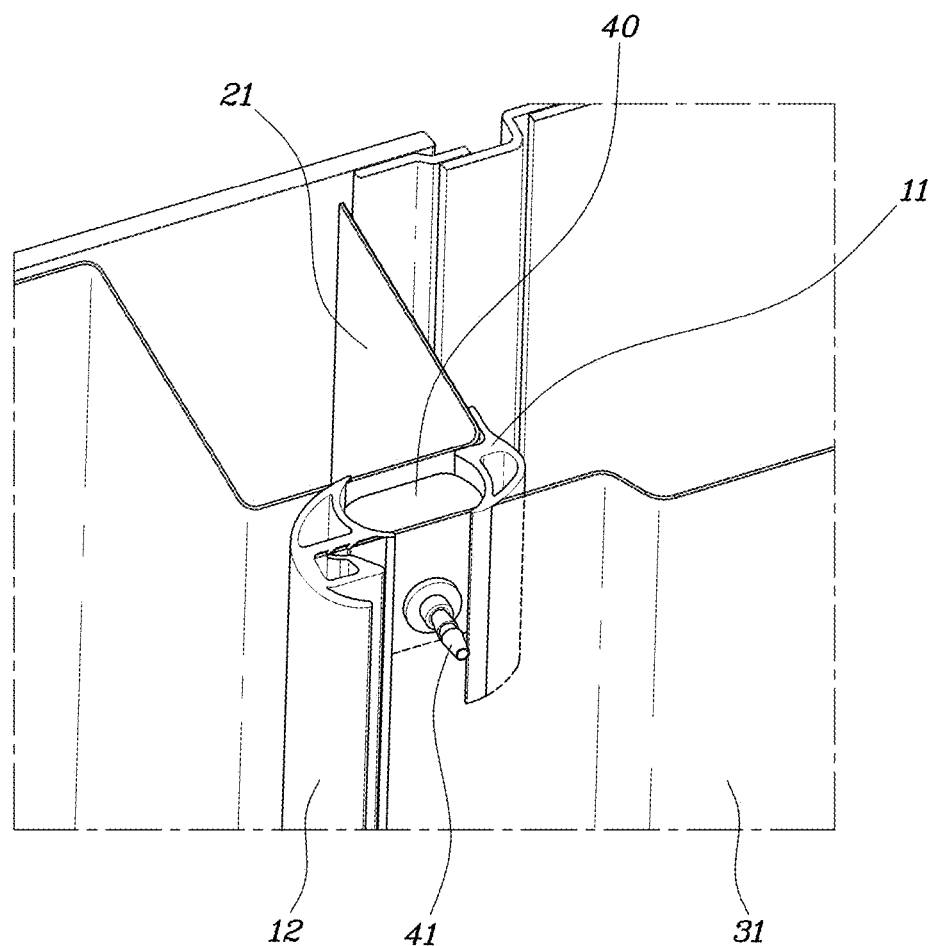

[FIG. 4]
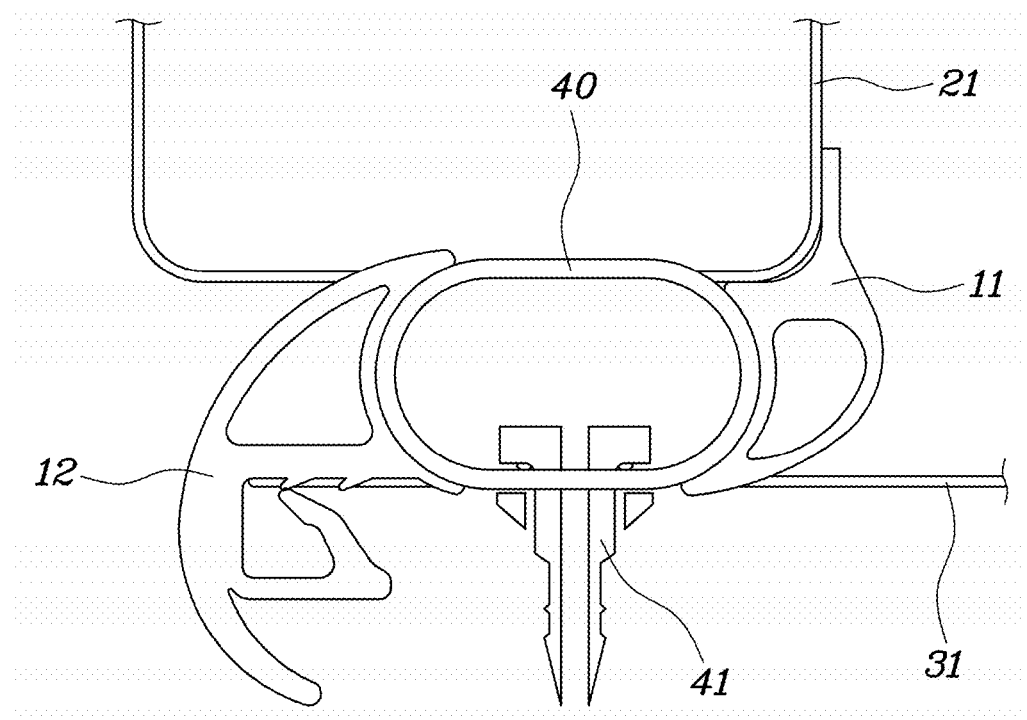

[FIG. 5]
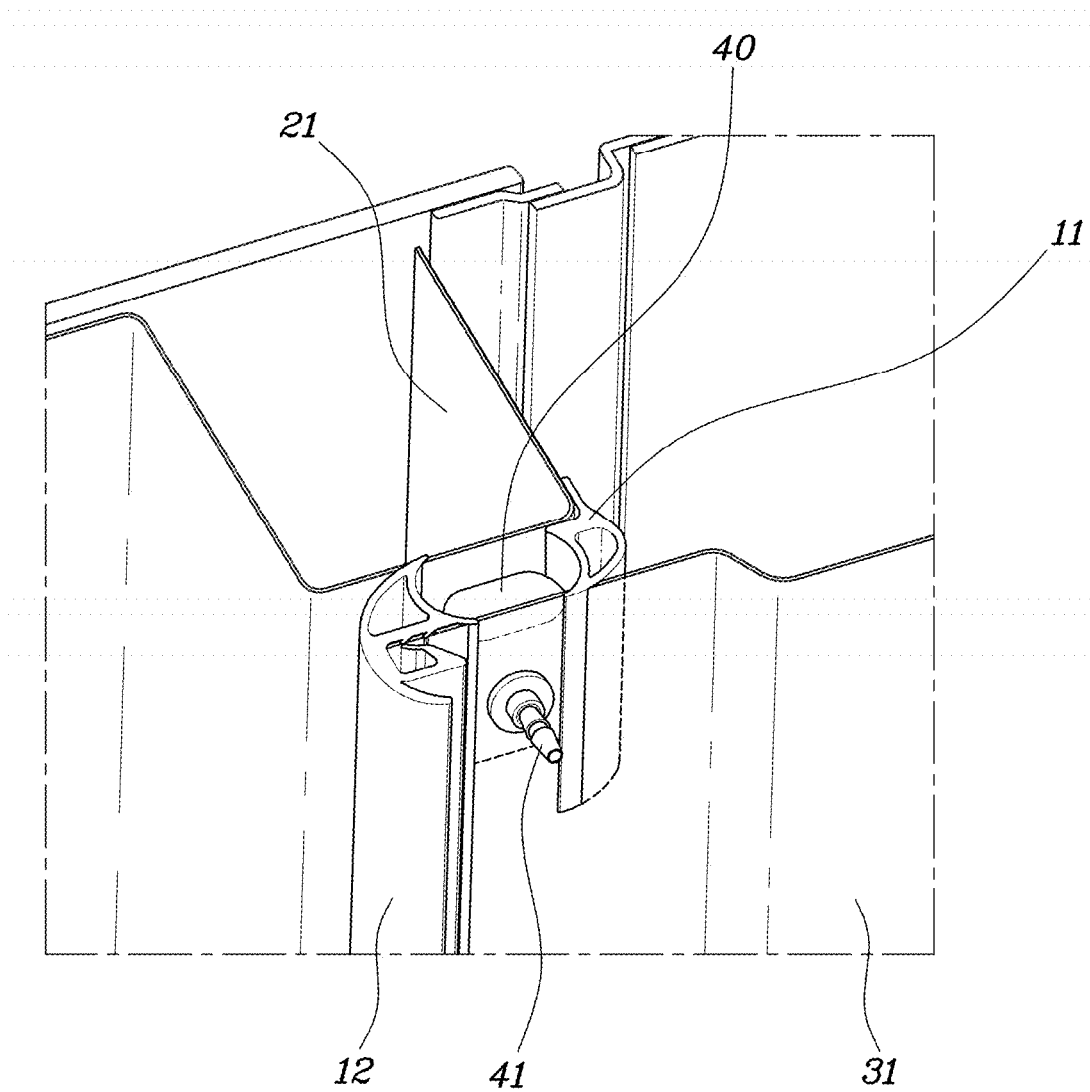

[FIG. 6]
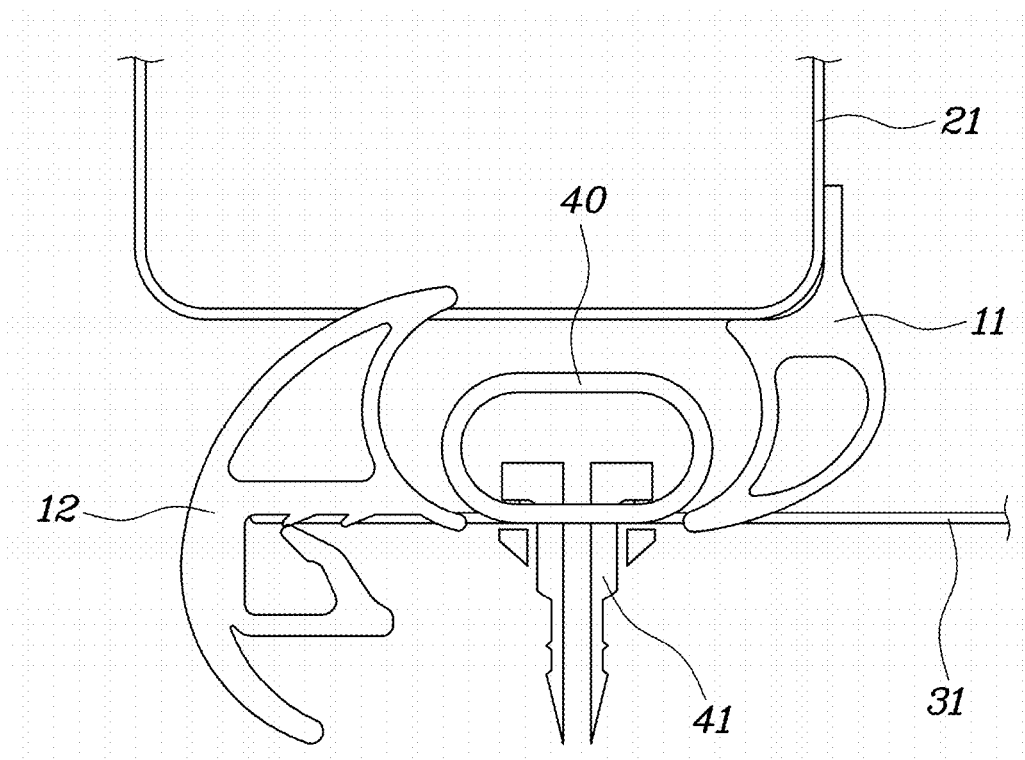

[FIG. 7]
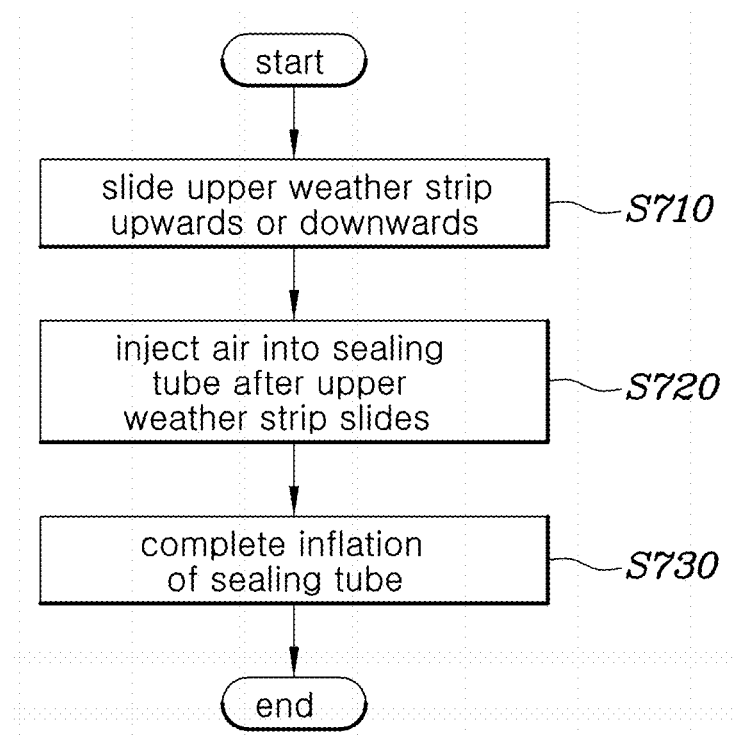

VEHICLE-BUILDING DOCKING SYSTEM AND METHOD OF CONTROLLING THE SAME

CROSS-REFERENCE TO RELATED APPLICATION

The present application claims priority to Korean Patent Application No. 10-2022-0175036, filed on Dec. 14, 2022, the entire contents of which is incorporated herein for all purposes by this reference.

BACKGROUND OF THE PRESENT DISCLOSURE

Field of the Present Disclosure

The present disclosure relates to a vehicle-building docking system and a method of controlling the same. It relates to a vehicle-building docking system having a structure in which a double weather strip is applied to prevent inflow of external dust, noise, and the like, securing sealing performance of the weather strip and at the same time preventing the weather strip from being worn out.

Description of Related Art

Recently, interest in electric vehicles and autonomous vehicles has increased, and accordingly various utilizes and forms of vehicles are being developed. In an autonomous vehicle, occupants may move freely in the internal space of the vehicle, and thus connectivity in which the vehicle is connected to various other environments becomes important.

Accordingly, when the vehicle is connected to a residential space and the vehicle is docked to the building, a concept in which the internal space of the vehicle may be used as an extension of the residential space may be considered.

Meanwhile, when the internal space of the vehicle and the internal space of the building are simply docked to each other without being sealed while the vehicle is parked, external dust and noise may flow in, making it difficult to use the internal space of the vehicle as a residential space.

FIG. 1 and FIG. 2 are views exemplarily illustrating weather strips positioned in a vertical direction as the internal space of a vehicle expands upwards.

Referring to FIG. 1 and FIG. 2, weather strips may each be provided at an upper side and a lower side of a vehicle door to secure dustproofing, soundproofing, and heat-dissipating performance. Here, in a state in which the internal space is expanded as the roof of the vehicle is raised or in a state in which the internal space is reduced as the roof is lowered, airtightness of the vehicle door may not be maintained, failing to secure dustproofing, soundproofing, and heat dissipation performance. When a portion where the weather strips overlap each other (A in FIG. 2) is hermetically sealed to solve the problem, repeated sliding of the upper weather strip in the vertical direction may cause abrasion of the weather strips in the portion.

For the present reason, there is a demand for a method of securing the sealing performance of the weather strips and at the same time preventing the weather strips from being worn.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle-building docking system and a method of controlling the same, the docking system including a structure in which a weather strip configured to prevent inflow of external dust and noise is doubly applied in a vertical direction, securing sealing performance of the weather strip and at the same time preventing the weather strip from being worn out.

The technical problems to be solved as an exemplary embodiment of the present disclosure are not limited to the technical problems described above, and other technical problems not described herein may be clearly understood by those including ordinary knowledge in the art from the description of the examples.

In accordance with an aspect of the present disclosure, the above and other objects may be accomplished by the provision of a vehicle-building docking system, the docking system including a lower weather strip coupled to a lower door frame, an upper weather strip coupled to an upper door frame and configured to slide upwards or downwards together with the upper door frame with respect to the lower weather strip, and a sealing tube provided between the lower weather strip and the upper weather strip and configured to inflate after the upper weather strip slides upwards or downwards to seal the gap between the lower weather strip and the upper weather strip.

The docking system may further include a controller configured to control inflation or shrinkage of the sealing tube.

In an inflation mode in which the sealing tube inflates, the controller may inject air into the sealing tube so that the sealing tube is in a pressure higher than a predetermined pressure.

In a shrinkage mode in which the sealing tube shrinks, the controller may discharge air from the sealing tube so that the sealing tube is in a pressure lower than a predetermined pressure.

The docking system may further include an air pump provided at one side of the sealing tube and including therein an air passage through which air is injected into or discharged from the sealing tube. Here, in the inflation mode, the controller may open the air pump to inject air into the sealing tube.

When inflation of the sealing tube is completed, one side of the sealing tube may be brought into contact with the lower weather strip and another side of the sealing tube may be brought into contact with the upper weather strip.

The lower weather strip and the upper weather strip each may have a cross-section in a longitudinal direction having a partially elliptical shape facing in opposite directions.

The upper weather strip may slide in a vertical direction while being spaced from the lower weather strip, and the sealing tube may be provided in a space in which the upper weather strip and the lower weather strip overlap each other in a longitudinal direction and are spaced from each other.

The sealing tube may be made of a dielectric elastomer (DE).

In accordance with another aspect of the present disclosure, there is provided a method of controlling a vehicle-building docking system, the docking system including a lower weather strip coupled to a lower door frame, an upper weather strip coupled to an upper door frame, and a sealing tube provided between the lower weather strip and the upper weather strip, the method including sliding the upper weather strip upwards or downwards together with the upper door frame with respect to the lower weather strip, and sealing a gap between the lower weather strip and the upper weather strip by inflating the sealing tube after the upper weather strip slides upwards or downwards.

The sealing the gap between the lower weather strip and the upper weather strip may include, in an inflation mode in which the sealing tube inflates, injecting air into the sealing tube so that the sealing tube is in a pressure higher than a predetermined pressure.

The method may further include, in a shrinkage mode in which the sealing tube shrinks, discharging air from the sealing tube so that the sealing tube is in a pressure lower than a predetermined pressure.

The docking system may further include an air pump provided at one side of the sealing tube and including therein an air passage through which air is injected into or discharged from the sealing tube, and the sealing the gap between the lower weather strip and the upper weather strip may include, in the inflation mode, opening the air pump, by the controller, to inject air into the sealing tube.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 and FIG. 2 are views exemplarily illustrating weather strips positioned in a vertical direction as the internal space of a vehicle expands upwards;

FIG. 3 is a view exemplarily illustrating a sealing tube configured to inflate after an upper weather strip according to various exemplary embodiments of the present disclosure slides upwards or downwards;

FIG. 4 is a cross-sectional view of FIG. 3 according to various exemplary embodiments of the present disclosure;

FIG. 5 is a view exemplarily illustrating a sealing tube being shrunken while an upper weather strip according to various exemplary embodiments of the present disclosure is sliding upwards or downwards;

FIG. 6 is a cross-sectional view of FIG. 5 according to various exemplary embodiments of the present disclosure; and FIG. 7 shows a process of operating a vehicle-building docking system according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings, the same reference numerals are used to designate the same/like components, and a redundant description thereof will be omitted.

In general, suffixes such as "module" and "unit" may be used to refer to elements or components. Use of such a suffix herein is merely intended to facilitate description of the specification, and the suffix itself is not intended to have any special meaning or function.

In describing the present disclosure, if a detailed explanation of a related known function or construction is considered to unnecessarily obscure the gist of the present disclosure, such explanation has been omitted but would be understood by those skilled in the art. The accompanying drawings are used only to help easily explain the technical idea of the present disclosure, and it should be understood that the idea of the present disclosure is not limited by the accompanying drawings. The idea of the present disclosure should be construed to encompass any alterations, equivalents and substitutes beyond what is shown in the accompanying drawings. It will be understood that, although the terms first, second, etc. may be used herein to describe various elements, these elements should not be limited by these terms. These terms are generally only used to distinguish one element from another.

It will be understood that, when an element is referred to as being "connected to" another element, the element may be directly connected to the other element or intervening elements may also be present. In contrast, it should be understood that, when an element is referred to as being "directly connected to" another element, there are no intervening element present.

A singular representation may include a plural representation unless it represents a definitely different meaning from the context.

Terms such as "include" or "has" used herein should be understood as indicating the existence of several elements, functions or steps, included in the specification, and it is also understood that greater or fewer elements, functions, or steps may likewise be utilized.

According to various exemplary embodiments of the present disclosure, there is provided a structure in which a weather strip is doubly applied to secure sealing performance of the weather strip and at the same time prevent the weather strip from being worn out.

FIG. 3 is a view exemplarily illustrating a vehicle-building docking system including a sealing tube configured to inflate after an upper weather strip according to various exemplary embodiments of the present disclosure slides upwards or downwards. FIG. 3 mainly illustrates the components related to the exemplary embodiment of the present disclosure. Of course, in realization of the vehicle-building docking system, fewer or more components may be included.

Referring to FIG. 3, the vehicle-building docking system according to various exemplary embodiments of the present disclosure may include an upper weather strip 11, a lower weather strip 12, and a sealing tube 40.

First, the upper weather strip 11 may be coupled to the internal side of an upper door frame 21 and may slide along with the upper door frame 21 in a vertical direction with respect to the lower weather strip 12. The upper door frame 21 is fixed to an upper body 20 and may slide along with a roof in the vertical direction when the internal space expands upwards or contracts downwards as the roof is raised or lowered. The upper weather strip 11, as illustrated in FIG. 1, may protrude toward a vehicle door with respect to the upper door frame 21. In a normal mode in which the roof is not raised, the upper weather strip 11 may extend from the upper end portion of the vehicle door to opposite end portions of the vehicle door and extend to a point that does not reach a point where the upper body 20 and a lower body 30 meet, with respect to the vertical height of the vehicle. Furthermore, the upper weather strip 11 is made of rubber to ensure sealing performance of the upper side of the vehicle door.

The lower weather strip 12 may be coupled to the internal side of a lower door frame 31. The lower door frame 31 is fixed to the lower body 30, but unlike the upper weather strip 11, the lower door frame 31 does not slide vertically even when the internal space expands upwards or contracts downwards as the roof is raised or lowered. The lower weather strip 12, as illustrated in FIG. 1, may protrude toward the vehicle door with respect to the lower door frame 31. In the normal mode in which the roof is not raised, the lower weather strip 12 may extend from the lower end portion of the vehicle door to opposite end portions of the vehicle door and extend to the upper body 20, with respect to the vertical height of the vehicle. The lower weather strip 12 may also be made of rubber like the upper weather strip 11 to secure sealing performance of the lower side of the vehicle door.

Although it is assumed that each of the aforementioned upper weather strip 11 and lower weather strip 12 is provided as a single piece, it will be apparent to those skilled in the art that each of the same may be plural in number.

Between the normal mode where the roof is not raised and an expansion mode where the roof is raised and the internal space is expanded, there is a difference in the length of the upper weather strip 11 and the lower weather strip 12 overlapping each other in the vertical direction thereof. In the normal mode, the overlapping length is the maximum, and in the expansion mode, the overlapping length is the minimum. Here, the upper weather strip 11 is spaced from the lower weather strip 12 with a predetermined distance in the longitudinal direction of the vehicle, preventing wear of the overlapped portion due to frequent raising and lowering of the upper weather strip 11.

However, to prevent the sealing performance from not being secured at all due to the separation of the upper weather strip 11 and the lower weather strip 12 with a predetermined distance in the longitudinal direction of the vehicle, it is necessary to make the upper weather strip 11 and the lower weather strip 12 end face contact each other using a separate structure. Sealing may be secured by end face contact using the sealing tube 40 overlapped between the upper weather strip 11 and the lower weather strip 12.

Hereinafter, the sealing tube 40 will be described.

The sealing tube 40 is provided in a space in which the upper weather strip 11 and the lower weather strip 12 overlap each other in the longitudinal direction and are spaced from each other to perform functions depending on inflation and shrinkage. After the upper weather strip 11 slides upwards or downwards, the sealing tube 40 may inflate to seal the gap between the lower weather strip 12 and the upper weather strip 11, and while the upper weather strip 11 is sliding upwards or downwards, the sealing tube 40 may shrink to open the gap between the lower weather strip 12 and the upper weather strip 11. The sealing tube 40 may be made of rubber to secure elasticity for injection and discharge of air. Meanwhile, the sealing tube 40 may be made of a dielectric elastomer (DE). DE is a material having good flexibility, fast response speed, and high deformation amount compared to weight, like human muscles, and is widely used in the latest technology field. For the present reason, DE may be used as a material for the sealing tube 40.

Injecting air into the sealing tube 40 and discharging air from the sealing tube 40 may be performed by an air pump 41 provided at one side of the sealing tube 40. The air pump 41 may have formed therein an air passage through which air is injected into or discharged from the sealing tube 40. Furthermore, the air pump 41 may be disposed to face the internal side of the vehicle door.

Furthermore, injection and discharge of air into and from the sealing tube 40 may be controlled by a controller forming the vehicle-building docking system. In an inflation mode in which the sealing tube 40 inflates, the controller may open the air pump 41 to inject air into the sealing tube 40 so that the sealing tube 40 maintains a high-pressure state, and in a shrinkage mode in which the sealing tube 40 shrinks, the controller electrically connected to the air pump 41 may open the air pump 41 to discharge air from the sealing tube 40 so that the sealing tube 40 maintains a low pressure or vacuum state. To secure sealing performance even while the vehicle is traveling, the controller may maintain the sealing tube 40 in a high pressure state not only after the upper weather strip 11 slides upwards or downwards, but also in a state in which the vehicle has been switched from a stop mode in which the vehicle is stopped to a drive mode for traveling or in a travel mode state in which the vehicle is traveling.

The cross section in the longitudinal direction of the vehicle and the shape of the sealing tube 40 in the inflation mode or in the shrinkage mode will be described with reference to FIG. 4, FIG. 5 and FIG. 6.

FIG. 4 is a cross-sectional view of FIG. 3 according to various exemplary embodiments of the present disclosure. Referring to FIG. 4, the lower weather strip 12 and the upper weather strip 11 each may have a cross-section in the longitudinal direction having a partially elliptical shape facing in opposite directions. This is to ensure that one side and another side of the inflated sealing tube 40 are brought into smooth contact with the lower weather strip 12 and the upper weather strip 11, respectively. The upper weather strip 11 may have one side fixed to the upper door frame 21 and the lower weather strip 12 may have one side fixed to the lower door frame 31 by fitting.

FIG. 5 is a view exemplarily illustrating the sealing tube 40 being shrunken while the upper weather strip 11 according to various exemplary embodiments of the present disclosure is sliding upwards or downwards. Furthermore, FIG. 6 is a cross-sectional view of FIG. 5 according to various exemplary embodiments of the present disclosure. Referring to FIG. 5 and FIG. 6, the sealing tube 40 maintains a low pressure or vacuum state in the shrinkage mode, and thus the sealing tube 40 has a shrunken shape. Here, because the upper weather strip 11 is sliding in the vertical direction, a first side and a second side of the sealing tube 40 may maintain a state in which the same do not come into contact with the lower weather strip 12 and the upper weather strip 11, respectively. With the present configuration, anti-wear performance of the portion where the upper weather strip 11 and the lower weather strip 12 overlap each other may be secured and durability may be maintained.

Based on the above-described vehicle-building docking system, a method of controlling the vehicle-building docking system according to an exemplary embodiment will be described with reference to FIG. 7.

FIG. 7 shows the process of operating the vehicle-building docking system according to various exemplary embodiments of the present disclosure.

Referring to FIG. 7, in the inflation mode, the upper weather strip 11 may slide upwards or downwards in step S710. Thereafter, the controller may inject air into the sealing tube 40 to inflate the sealing tube 40 in a state in which the upper weather strip 11 has slid upwards or downwards in step S720. Accordingly, the controller finishes injecting air into the sealing tube 40, and one side of the sealing tube 40 is brought into contact with the lower weather strip 12 and another side of the sealing tube 40 is brought into contact with the upper weather strip 11 to thereby complete sealing between the lower weather strip 12 and the upper weather strip 11 in step S730. In the inflation mode in which the sealing tube 40 inflates, air is injected into the sealing tube 40 so that the sealing tube 40 is in a high-pressure state. Here, in the shrinkage mode in which the sealing tube 40 shrinks, the controller may discharge air from the sealing tube 40 so that the sealing tube 40 is in a vacuum state.

Detailed technical features in each step of the method of controlling the vehicle-building docking system according to an exemplary embodiment of the present disclosure are the same as or similar to the technical features of each component in the vehicle-building docking system according to an exemplary embodiment of the present disclosure described above, and detailed description thereof will thus be omitted.

According to the exemplary embodiments of the present disclosure described so far, sealing performance of the weather strip may be secured and the weather strip may be prevented from being worn, owing to the structure in which the weather strip configured to prevent inflow of external dust and noise is doubly applied in the vertical direction thereof.

As is apparent from the above description, various aspects of the present disclosure are directed to providing a vehicle-building docking system and a method of controlling the same, the docking system having a structure in which a weather strip configured to prevent inflow of external dust and noise is doubly applied in a vertical direction, securing sealing performance of the weather strip and at the same time preventing the weather strip from being worn out.

The effects obtained as an exemplary embodiment of the present disclosure are not limited to the effects mentioned above, and other effects not mentioned herein will be clearly understood by those skilled in the art from the above description.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle-building docking system, the docking system comprising:
    a lower weather strip coupled to a lower door frame;
    an upper weather strip coupled to an upper door frame and configured to slide upwards or downwards together with the upper door frame with respect to the lower weather strip; and
    a sealing tube provided between the lower weather strip and the upper weather strip and configured to inflate after the upper weather strip slides upwards or downwards to seal a gap between the lower weather strip and the upper weather strip.

2. The docking system of claim 1, further including a controller configured to control inflation or shrinkage of the sealing tube.

3. The docking system of claim 2, wherein, in an inflation mode in which the sealing tube inflates, the controller is configured to inject air into the sealing tube so that the sealing tube is in a pressure higher than a predetermined pressure.

4. The docking system of claim 2, wherein, in a shrinkage mode in which the sealing tube shrinks, the controller is configured to discharge air from the sealing tube so that the sealing tube is in a pressure lower than a predetermined pressure.

5. The docking system of claim 2, further including:
    an air pump provided at one side of the sealing tube and including therein an air passage through which air is injected into or discharged from the sealing tube,
    wherein, in an inflation mode, the controller is configured to open the air pump to inject the air into the sealing tube.

6. The docking system of claim 1, wherein, when inflation of the sealing tube is completed, a first side of the sealing tube is brought into contact with the lower weather strip and a second side of the sealing tube is brought into contact with the upper weather strip.

7. The docking system of claim 1, wherein the lower weather strip and the upper weather strip each have a cross-section in a longitudinal direction having a partially elliptical shape facing in opposite directions.

8. The docking system of claim 1, wherein the upper weather strip slides in a vertical direction while being spaced from the lower weather strip, and the sealing tube is provided in a space in which the upper weather strip and the lower weather strip overlap each other in a longitudinal direction and are spaced from each other.

9. The docking system of claim 1, wherein the sealing tube is made of a dielectric elastomer (DE).

10. A method of controlling a vehicle-building docking system, the docking system including a lower weather strip coupled to a lower door frame, an upper weather strip coupled to an upper door frame, and a sealing tube provided between the lower weather strip and the upper weather strip, the method comprising:
    sliding, by a controller, the upper weather strip upwards or downwards together with the upper door frame with respect to the lower weather strip; and
    sealing, by the controller, a gap between the lower weather strip and the upper weather strip by inflating the sealing tube after the upper weather strip slides upwards or downwards.

11. The method of claim 10, wherein the sealing the gap between the lower weather strip and the upper weather strip includes:
    in an inflation mode in which the sealing tube inflates, injecting, by the controller, air into the sealing tube so that the sealing tube is in a pressure higher than a predetermined pressure.

12. The method of claim 10, further including:
    in a shrinkage mode in which the sealing tube shrinks, discharging, by the controller, air from the sealing tube so that the sealing tube is in a pressure lower than a predetermined pressure.

13. The method of claim 10,
    wherein the docking system further includes an air pump provided at one side of the sealing tube and including therein an air passage through which air is injected into or discharged from the sealing tube, and
    wherein the sealing the gap between the lower weather strip and the upper weather strip includes, in an inflation mode, opening the air pump, by the controller, to inject the air into the sealing tube.

14. The method of claim 10, further including:
    maintaining the sealing tube in a pressure higher than a predetermined pressure not only after the upper weather strip slides upwards or downwards, but also in a state in which a vehicle has been switched from a stop mode in which the vehicle is stopped to a drive mode for traveling or in a travel mode state in which the vehicle is traveling.

15. The method of claim 10, wherein, when inflation of the sealing tube is completed, a first side of the sealing tube is brought into contact with the lower weather strip and a second side of the sealing tube is brought into contact with the upper weather strip.

16. The method of claim 10, wherein the upper weather strip slides in a vertical direction while being spaced from the lower weather strip, and the sealing tube is provided in a space in which the upper weather strip and the lower weather strip overlap each other in a longitudinal direction and are spaced from each other.

17. A non-transitory computer readable storage medium on which a program for performing the method of claim 10 is recorded.

* * * * *